(12) United States Patent
Voecks et al.

(10) Patent No.: US 7,622,088 B2
(45) Date of Patent: Nov. 24, 2009

(54) RAPID ACTIVATION CATALYST SYSTEM IN A NON-THERMAL PLASMA CATALYTIC REACTOR

(75) Inventors: Gerald E. Voecks, La Crescenta, CA (US); Paul Taichiang Yu, Pittsford, NY (US)

(73) Assignee: GM Global Technology Operations, Inc.

( * ) Notice: Subject to any disclaimer, the term of this patent is extended or adjusted under 35 U.S.C. 154(b) by 601 days.

(21) Appl. No.: 11/227,457

(22) Filed: Sep. 15, 2005

(65) Prior Publication Data

US 2007/0059235 A1    Mar. 15, 2007

(51) Int. Cl.
B01J 8/02 (2006.01)
B01J 8/44 (2006.01)

(52) U.S. Cl. .................. 422/211; 422/240; 422/311; 423/650

(58) Field of Classification Search .................. None
See application file for complete search history.

(56) References Cited

U.S. PATENT DOCUMENTS

| | | | |
|---|---|---|---|
| 5,015,349 A | 5/1991 | Suib et al. | |
| 5,131,993 A | 7/1992 | Suib et al. | |
| 5,155,994 A | 10/1992 | Muraki et al. | |
| 5,529,760 A | 6/1996 | Burris | |
| 5,817,218 A | 10/1998 | Hayashi et al. | |
| 5,893,267 A | 4/1999 | Vogtlin et al. | |
| 5,914,015 A | 6/1999 | Barlow et al. | |
| 5,928,804 A | 7/1999 | Leddy et al. | |
| 5,976,324 A | 11/1999 | Groschl et al. | |
| 6,010,798 A | 1/2000 | Hammerschmidt et al. | |
| 6,027,617 A | 2/2000 | Hayashi et al. | |
| 6,136,278 A | 10/2000 | Eliasson et al. | |
| 6,173,002 B1 | 1/2001 | Robert | |
| 6,176,078 B1 | 1/2001 | Balko et al. | |
| 6,190,507 B1 | 2/2001 | Whealton et al. | |
| 6,202,407 B1 | 3/2001 | Brusasco et al. | |
| 6,211,113 B1* | 4/2001 | Harth et al. | 502/200 |
| 6,238,629 B1* | 5/2001 | Barankova et al. | 422/186.04 |
| 6,245,309 B1 | 6/2001 | Etievant et al. | |
| 6,374,595 B1* | 4/2002 | Penetrante et al. | 60/275 |
| 7,147,947 B2* | 12/2006 | Wu et al. | 429/17 |
| 2002/0114747 A1* | 8/2002 | Marchand et al. | 422/198 |
| 2003/0162656 A1 | 8/2003 | Wu et al. | |
| 2004/0118046 A1 | 6/2004 | Williamson et al. | |

FOREIGN PATENT DOCUMENTS

WO    WO 99/12638    3/1999

OTHER PUBLICATIONS

Kraus, Martin, et. al., $CO_2$ reforming of methane by the combination of dielectric-barrier discharges and catalysis, Nov. 1, 2000, Phys. Chem. Chem Phys., 3, 294-300.*

* cited by examiner

*Primary Examiner*—Melvin C Mayes
*Assistant Examiner*—Melissa Stalder
(74) *Attorney, Agent, or Firm*—Harness, Dickey & Pierce, P.L.C.

(57) ABSTRACT

A rapid start reactor is provided that can be used, for example, in a water gas shift reactor of a fuel processor. A reactor has a catalyst support structure with one or more surfaces overlaid with an active coating that includes a catalyst. The active coating heats upon exposure to a non-thermal energy source. The reactor also includes a generator of non-thermal energy for applying non-thermal energy to the active coating. Methods for operating such a reactor during transient and/or start-up conditions are also provided.

15 Claims, 5 Drawing Sheets

RAPID ACTIVATION CATALYST SYSTEM IN A NON-THERMAL PLASMA CATALYTIC REACTOR

FIELD OF THE INVENTION

The present invention relates to fuel cell systems, and more particularly, to a catalytic reactor for use in a fuel processor of a fuel cell system.

BACKGROUND OF THE INVENTION

Fuel cells have been proposed as a power source for a variety of applications, including electrical vehicular power plants replacing internal combustion engines. In proton exchange member (PEM) type fuel cells, hydrogen is supplied to an anode of the fuel cell and oxygen is supplied as an oxidant to the cathode of the fuel cell. The resultant electricity can be utilized to run an electric motor or for other purposes depending upon the ultimate use of the fuel cell system.

For vehicular and other applications, it may be desirable to use a liquid fuel, such as gasoline, diesel, methanol and the like, as a source of hydrogen for the fuel cell if hydrogen is not an available fuel. Such liquid fuels must be dissociated or reformed by releasing the hydrogen content thereof. The dissociation reaction is generally accomplished in a fuel processor that may include a series of reactors, including an autothermal reformer or a steam reformer as the primary reactor. For many reactor systems, especially for those in mobile applications, a fast start time requiring minimal energy is important. One significant aspect of start time includes the time that it takes to reach catalyst "light-off" or activation temperatures. Many current techniques for quick heatup of catalysts depend upon heating the entire reactor bed. Some current methods of heating the catalyst include resistive heating of the catalyst support (EHC), exposing the reactor bed to hot reformate gas, or by generating heat via reformate oxidation. However, these methods generally operate by non-selective heating of the entire reactor system including the entire mass of the reactor bed, which potentially results in energy lost by heat dissipation from the catalytically active sites and by heating the bulk of the reactor, consequently resulting in longer times to reach start-up temperature. For example, reformate oxidation entails adding air to chemically react with the reducing gas entering the catalyst bed, which generally provides a relatively fast heating of the catalyst to activation temperatures. However, in addition to non-selective heating of the reactor bed, the heat distribution is often not uniform throughout the entire reactor and bed, generally because the front or entrance of the reactor bed goes through a very rapid rise in temperature, as where the exit end remains relatively cool.

Since the effective conversion of hydrocarbon fuel is dependant upon the efficient, long-lived operation of the catalyst of the reactors, capable of thousands of startup operations, it is desirable to improve the thermal and conversion efficiency of the reactors under varying operating conditions. Thus, there is a need for a rapid uniform heating of the catalyst in a reactor system which is energy efficient.

SUMMARY OF THE INVENTION

In one aspect, the present invention relates to a reactor for rapid start-up that comprises a catalyst structure having a surface with one or more regions overlaid with an active coating. The active coating comprises a catalyst. The temperature of the active coating rapidly increases upon exposure to a non-thermal energy source. The reactor also comprises a generator of non-thermal energy for heating of the active coating.

In another aspect, the present invention relates to a method for operating a reactor during transient or start-up conditions. The method comprises providing a catalyst structure having a surface with one or more regions overlaid with an active coating comprising a catalyst. In various embodiments, the active coating is capable of absorbing energy upon exposure to a non-thermal energy source and efficiently converting this energy to thermal energy, resulting in a rapid temperature rise. The method comprises generating non-thermal energy for heating of the active coating with a non-thermal energy source generator, and heating the active coating to a temperature equal to or greater than an activation temperature of the catalyst.

In yet another aspect, the present invention relates to a shift reactor that comprises a catalyst structure having a surface with one or more regions overlaid with an active coating comprising a water gas shift catalyst. The active coating heats up to "light-off" temperature upon exposure to a non-thermal energy source, which is generated by a non-thermal energy generator for heating of the active coating.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
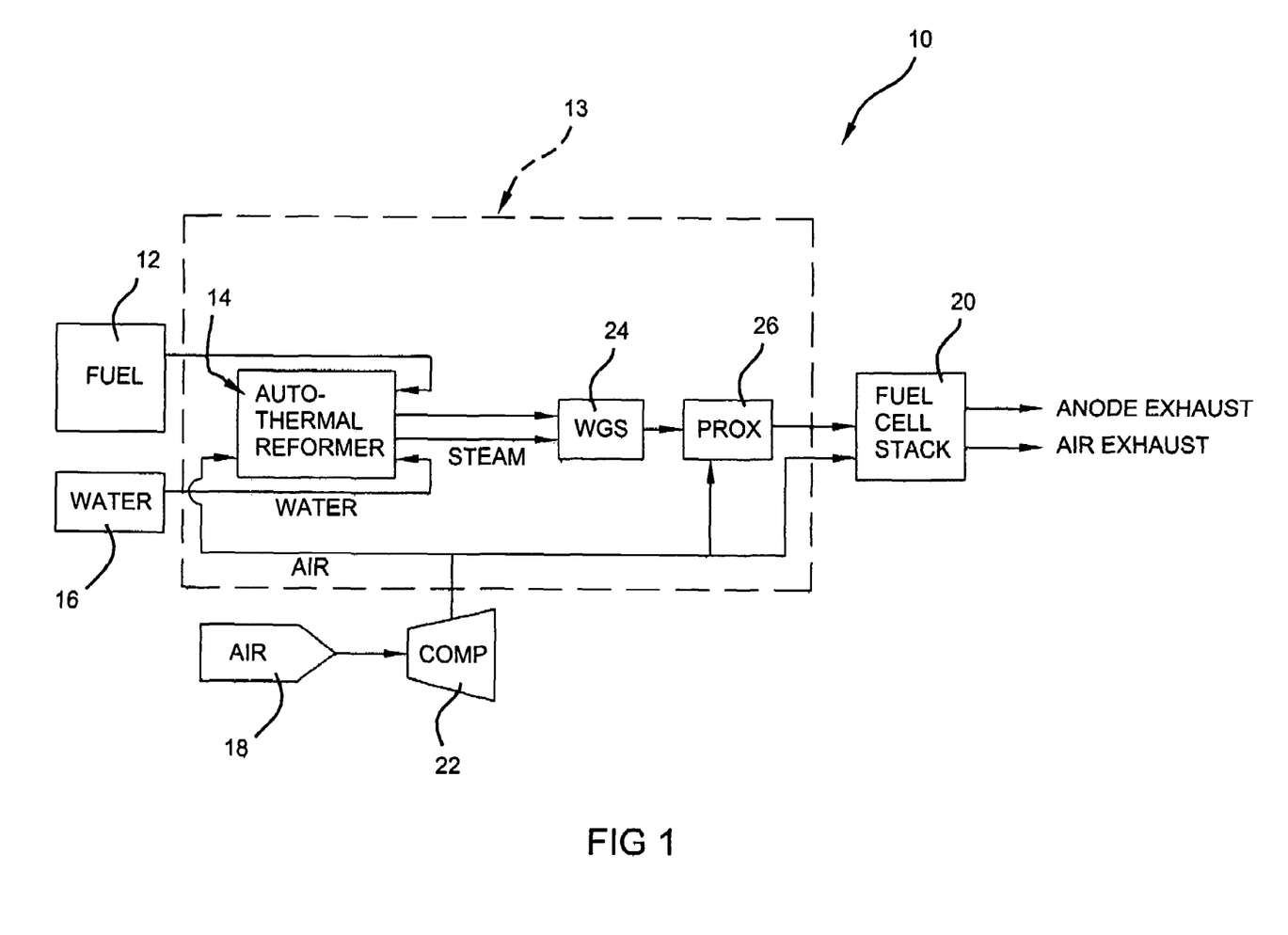
FIG. 1 is a schematic view of a fuel cell system including a fuel processor having a water gas shift (WGS) reactor.

With reference to FIG. 1, an exemplary PEM fuel cell system 10 is shown. The system 10 includes a fuel tank 12 for supplying a hydrocarbon fuel, such as, but not limited to, gasoline, to a fuel processing system 13. The fuel processing system 13 comprises an autothermal reformer (ATR) 14. The ATR 14 dissociates the hydrocarbon fuel using steam and air to produce a hydrogen-rich reformate gas. An exemplary process conducted in the ATR 14 includes air/steam/methane reformation process, where methane, air, and water (steam)

are ideally reacted to generate hydrogen and carbon oxides according to the reaction in Equation 1:

$$2CH_4 + 3H_2O + 0.5O_2(air) \rightarrow CO + CO_2 + 6H_2 + H_2O \quad (1)$$

A water tank 16 and an air source 18 are also included for respectively providing water and air to the ATR 14. Air is further supplied to a fuel cell stack 20 and is driven through the system by a compressor 22.

As can be observed in the reaction above, the ATR 14 typically yields a reformate gas comprising hydrogen, carbon monoxide, carbon dioxide, and potentially water, that is partly a function of the inlet feed and air/fuel ratio, as well. The carbon monoxide content of the reformate stream is generally too high for direct use in the PEM fuel cell stack 20, which, if not scrubbed from the reformate gas, would otherwise result in the catalyst in the fuel cell stack 20 being poisoned. Therefore, the reformate stream produced in the ATR 14 flows to a water gas shift (WGS) reactor 24, and further into a preferential oxidation (PROX) reactor 26 for reducing the carbon monoxide content to an acceptable level. The reaction in the WGS proceeds according to the reaction in Equation 2:

$$CO + H_2O \rightarrow CO_2 + H_2 \quad (2)$$

which involves the oxidation of carbon monoxide to carbon dioxide where water is the oxidant. The fuel stream leaving the water gas shift reactor 24 enters the PROX reactor 26 where final clean up of carbon monoxide takes place before the hydrogen rich stream enters the fuel cell stack 20. A relatively small amount of air is added to supply the oxygen needed to convert most of the remaining carbon monoxide to carbon dioxide, while consuming a minimal amount of hydrogen. The reformate stream then goes to the fuel cell stack 20.

The principles of the present invention are applicable to any reactor within the fuel processing system 13, including the ATR reactor 14, the WGS reactor 24, and the PROX reactor 26. In certain preferred embodiments, the WGS and PROX reactors 24,26 are constructed in accordance with the principles of the present invention. In other preferred embodiments, the WGS reactor 24 is prepared in accordance with the present invention. For purposes of illustrating the principles by which the present invention operates, a WGS reactor 24 is shown in FIG. 2.

Figure 2:
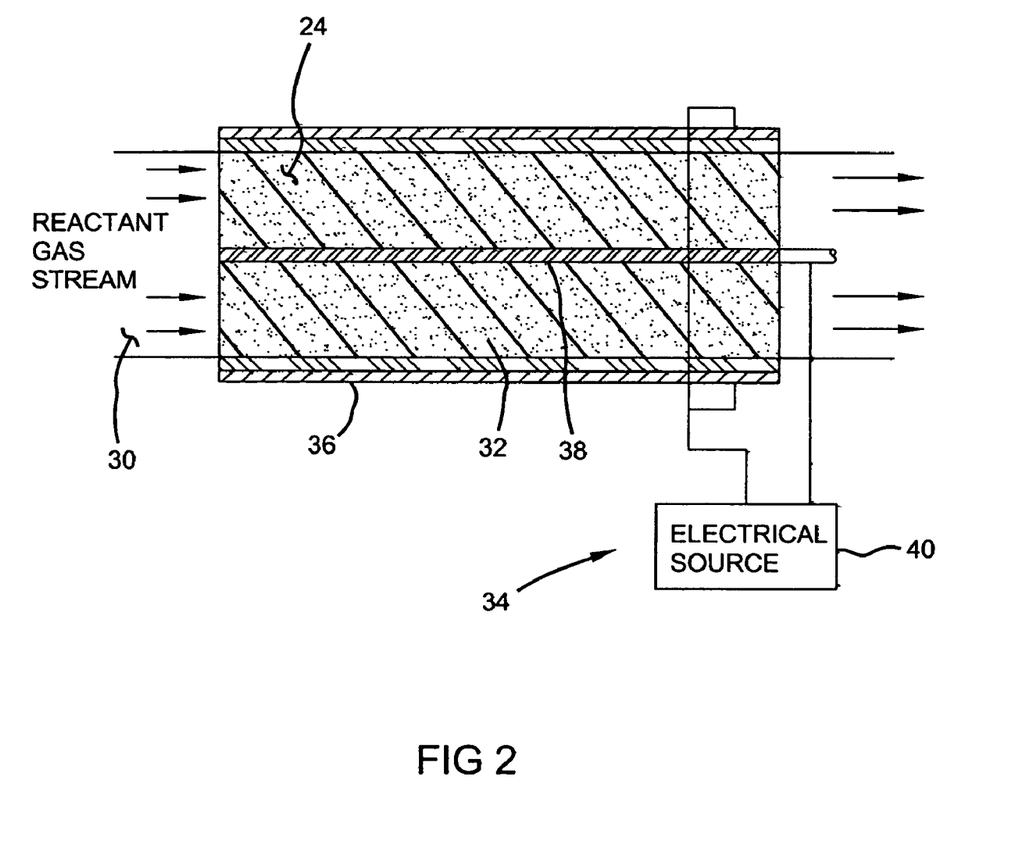
FIG. 2 is a cross-sectional view of a WGS reactor according to the principles of the present invention.

In one embodiment of the present invention, a reactant gas stream is delivered from the ATR 14 (that includes hydrogen, water (as steam), and carbon monoxide) to the WGS reactor 24 via a flow passage 30, as shown in FIG. 2. A catalyst bed 32 is disposed within the flow passage 30. A non-thermal energy generator device 34 is provided for generating a non-thermal energy plasma within the catalyst bed 32.

Figure 3:
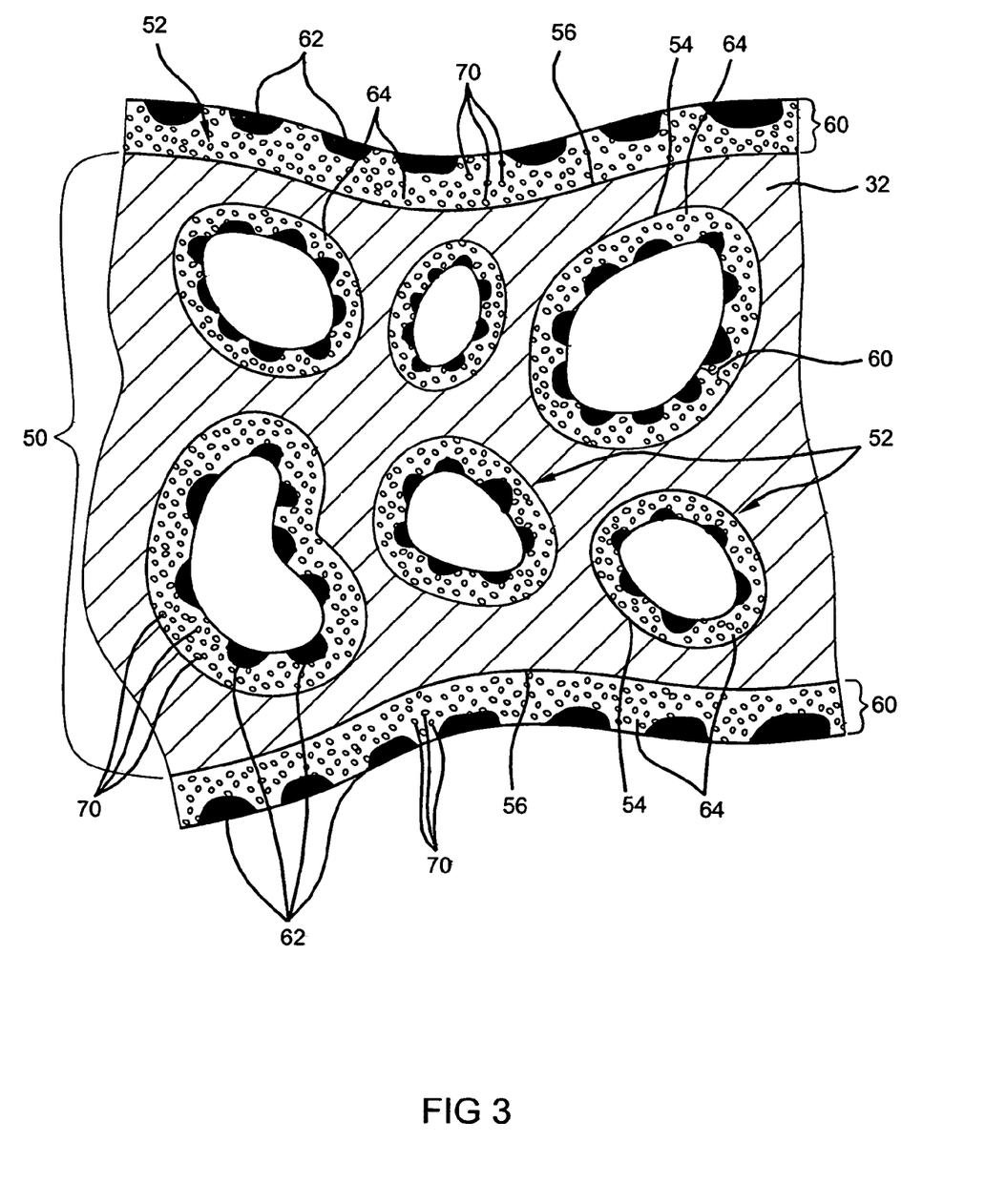
FIG. 3 is a detailed cross-sectional view of a catalyst support material having surfaces overlaid with an active coating layer including a catalyst and an active material according to principles of the present invention.

FIG. 3 shows a detailed view of a cross-section of a reactor catalyst bed 32 according to one preferred embodiment of the present invention. The catalyst bed 32 includes a catalyst support structure 50 that is made of traditional catalyst support materials known to one of skill in the art, such as a substantially electrically and thermally non-conducting material, including ceramics. (e.g., zirconia, alumina, cordierite) or other similar materials. Preferred support structures 50 are highly porous, both on a macroscopic and microscopic basis. One suitable example includes an open-celled ceramic foam that has a pore density of approximately 10 to 100 pores per inch (PPI). The pore density of the catalyst bed 32 and the size of the flow passage 30 are selected to provide sufficient flow of the reactant gas stream therethrough in order to provide an appropriately low pressure drop, tortuous flow pattern, reactant gas interaction with catalyzed surfaces, and adequate gas plasma penetration throughout the catalyst bed. Other porous support structures 50 may also be utilized. Variables useful in support structure design include the material composition, support wall thickness, pore density of the design structure (particularly where the structure is a foam), and good adhesion of the catalyst and washcoat, to each other and to the support. Other factors relating to catalyst system choice can include the catalyst type, catalyst loading, catalyst dispersion, catalyst washcoat, and catalyst bed geometry.

Thus, in various embodiments, the preferred catalyst support 50 includes an open cell structure similar to "foam" or a "sponge." The open cell structure differs from a closed cell or honeycomb structure and from a packed catalyst bed which is a collection of several independent pellets, tablets, rings, and the like, that are packed together and form variable flow paths. The open cell foam catalyst is provided with voids or pores throughout the foam structure to (1) allow for easy generation, propagation, penetration and distribution of the plasma produced by the plasma generator 34, and (2) provide active catalyst surfaces throughout the catalyst bed 32 that are highly accessible to both the plasma and reactant gas flow.

The catalyst support structure 50 has surfaces 52 that contact gas as it passes through the flow passage 30 (of FIG. 2). Such surfaces 52 include both internal and external pore surfaces (54, 56, respectively). One or more regions of these surfaces 52 are overlaid with an active coating 60. In certain embodiments the active coating 60 may form a continuous layer coating the entire catalyst support surface 52, while in other embodiments, the regions may be discrete and discontinuous, thus only comprising a portion of the exposed catalyst support surfaces (not shown). The active coating 60 may include a single layer or may include a plurality of layers. In preferred embodiments, the active layer 60 comprises one or more catalysts 62. In various embodiments, the active coating 60 further comprises a washcoat or an adhesive material 64, which is well known to those of skill in the art. Generally, one or more catalysts 62 are dispersed within the washcoat/adhesive 64.

In certain embodiments of the present invention, such as the one shown in. FIG. 3, the active coating 60 comprises an active material 70. By "active" it is meant that the material is preferably activated upon exposure, i.e., it reacts with or is excited by a non-thermal energy source, such as non-thermal plasma or microwave energy. Upon exposure to the non-thermal energy source, the active material 70 preferably is heated rapidly, with minimal heat loss to the supporting structure and maximal activation of the incorporated catalyst 62. Such active materials 70 can either be included as particles dispersed within the active coating 60, as is shown in FIG. 3 or constitute the active coating 60 in its entirety.

Figure 4:
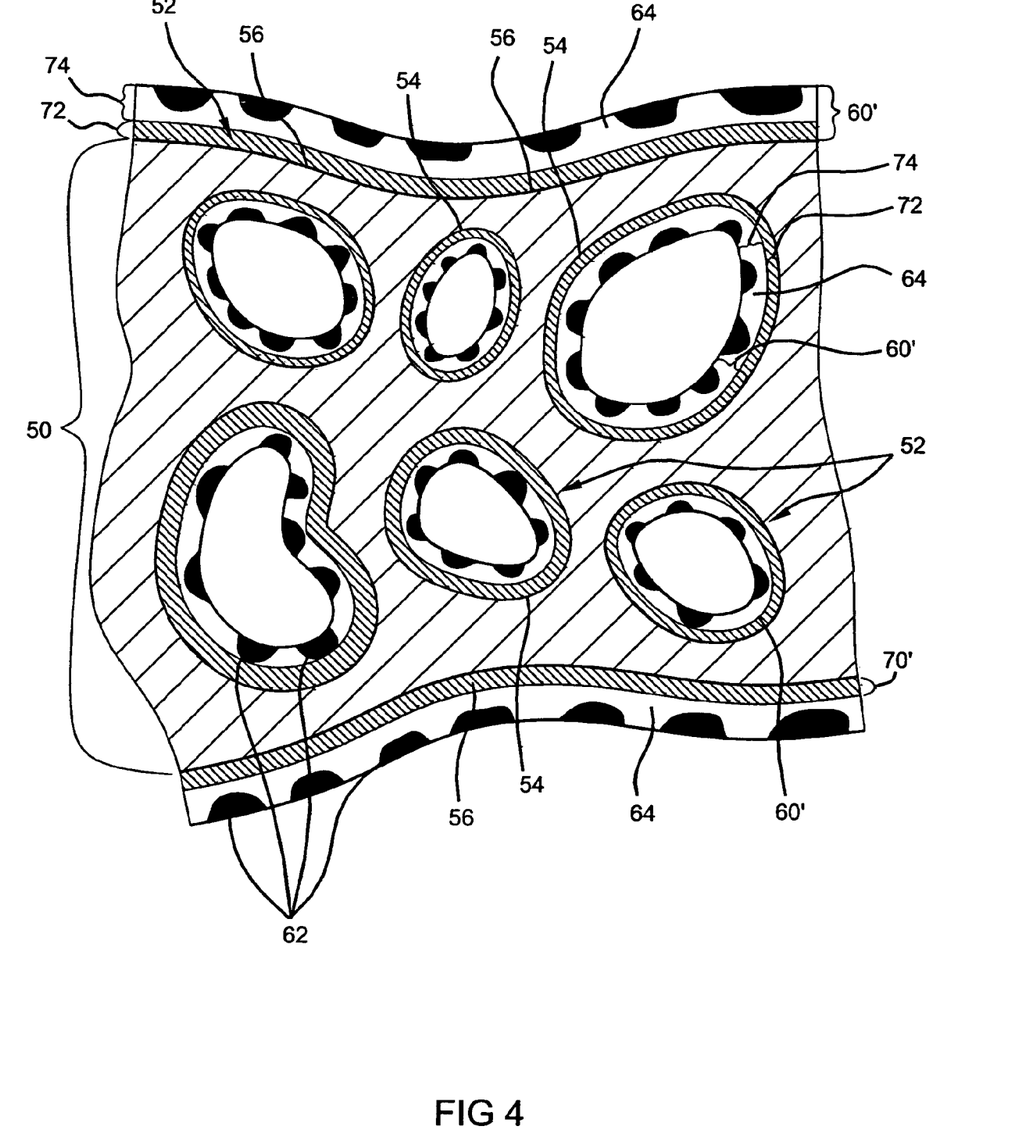
FIG. 4 is a detailed cross-sectional view of an alternative embodiment where an active coating layer comprises a first and a second layer, where the first layer includes an active material and the second layer includes a catalyst.

In an alternate embodiment, such as that shown in FIG. 4, the active coating 60' comprises a first layer 72 and a second layer 74. The first layer 72 comprises an active material 70', which is applied as a sub-layer within the active coating 60'. The active material 70' is applied continuously over one or more of the surfaces 52 (e.g., 54,56) of the support structure 50 to form the first layer 72. The second layer 74 comprises the washcoat 64 and catalyst 62 mixture, which is preferably applied over the first layer 72 of active material 70'. In certain embodiments, the active material 70' of the first layer 72 has a thickness of less than 100 μm, preferably 50 μm, more preferably 25 μm, even more preferably 10 μm, and in certain preferred embodiments the active material 70' is applied as a monolayer over the catalyst support structure surfaces 52.

In accordance with the principles of the present invention, an active material 70 or 70' (for simplicity, referred to herein as 70) heats within the active coating 60 or 60' (for simplicity, referred to herein as 60) and conducts heat to the entire active coating layer 60, thus transferring heat to nearby catalyst particles 62 contained in the active coating 60, while simultaneously transferring minimal heat to the non-conducting support structure 50. Where the reactor system undergoes transient operating conditions and/or start-up conditions, the bulk of the catalyst support structure 50, as well as the catalyst structure surfaces 52 and active coating layer 60 including the catalyst particles 62 are at reduced temperatures (e.g., ambient temperatures) which are below an activation temperature associated with the catalyst.

At temperatures below the activation temperature of one or more catalysts, the catalysts 62 are substantially non-operational. The catalyst(s) temperature must be raised to the light-off or activation temperature in order to perform properly and to sufficiently facilitate chemical reaction. Thus, in accordance with the principles of the present invention, when the active material 70 in the active layer 60 is heated by exposure to a non-thermal energy source the generated heat from the active material 60 transfers to nearby catalyst particles 62, which reach or exceed the desired activation temperature, thus enabling catalyst activity and the desired chemical reactions to proceed in the reactor flow passage 30.

Where the active coating 60 is heated by application of non-thermal energy, it should be noted that the bulk of the catalyst support structure 50 does not need to be brought up to activation temperature. As such, various embodiments of the present invention enable catalyst activation in a much shorter duration, than would otherwise be possible by thermal convection and conduction. A further advantage of using non-thermal energy to heat an active coating 60 of the catalyst bed 32 is the substantially uniform dispersion of the non-thermal energy to all of the surfaces 52 of the catalyst bed 32 as well as throughout the interior of the catalyst support structure 50 particularly where the structure is a porous catalyst having longitudinal and lateral paths, which results in homogeneous heating and catalyst activation through the flow passage 30. The non-thermal energy can be applied to the catalyst bed 32 until the catalyst 62 can sustain continuous activity or reaction solely from the thermal energy, which can include a combined heat of reaction and preheat of the reactant gas mixture (normal operating temperatures) and there is no further need to apply non-thermal energy to maintain the activation of the active layer 60.

During normal non-transient operating conditions, the heat associated with incoming reactant gas streams and/or reactions occurring within the reactor 24 maintain the catalyst bed 32 at temperatures greater than or equal to the activation temperature of the catalysts 62. Thus, the present invention is particularly useful for rapid start-up of a reactor system, where the non-thermal energy used for start-up is efficiently and evenly targeted to the catalyst 62 within the active coating layer 60 without necessitating heating the bulk of the catalyst support structure 50 in addition to the active coating layer 60. It should be noted that the non-thermal energy can be applied concurrently with thermal energy transferred from reformate gas by conduction, convection, or oxidation, and as such all of these may contribute to heating the catalyst 62 to operating temperatures.

Preferred active materials (e.g., 70) that heat upon exposure to non-thermal energy, in particular to non-thermal plasma or microwave energy, include (1) oxides of metals such as titanium, cerium, lanthanum, (2) various materials with properties like ferrites (for example, $MOFe_2O_3$; where M may represent such elements as Cobalt (Co), Iron (Fe), Magnesium (Mg), Manganese (Mn), Chromium (Cr), Zinc (Zn), (3) silicon carbide (SiC), and (4) mixtures thereof. The unique property associated with the chosen material is that it absorbs the non-thermal energy and in so doing assists in activating the catalytic system. Other materials that are or may be known to one of skill in the art for selectively heating upon exposure to non-thermal plasma or microwave energy sources are also suitable.

In various embodiments, the active coating 60 comprises one or more catalysts 62. Selection of catalysts 62 depends upon the reactor in which they are to be used, as recognized by one of skill in the art. Exemplary catalyst materials for a water gas shift reactor 24 include, but are not limited to: copper/zinc oxide combinations, gold (Au) supported on metal oxides such as ceria or titania, Pt supported on tin oxide, and other mixtures representing typical low temperature water gas shift catalysts. Such catalysts generally have an activation temperature of about 150° C. to about 250° C. Typical catalyst materials for an auto-thermal reactor 14 include Pt, Pd, Ru, or Rh supported on alumina or similar support materials and base metals, alloys and mixtures thereof also supported on like support materials, which operate at temperatures in the range of 700 to 800° C. Preferential oxidizers 26 typically employ catalysts selected from noble metals, platinum (Pt), rhodium (Rh), palladium (Pd), ruthenium (Ru), alloys and mixtures thereof. Preferential oxidizers preferably operate at about 100° C. to about 200° C.

In other embodiments of the present invention, one or more of the catalysts 62 themselves are activated by exposure to a non-thermal energy source. As such, the catalyst 62 is "reactive" to the non-thermal energy source, and as such, may be chemically activated (for example, directly activated by plasma "hot" electrons or surface excitation), heated, or both, upon exposure to the non-thermal energy source, depending on both the catalyst material selected, as well as the non-thermal energy source applied. In yet other embodiments of the present invention, the active coating 60 includes both an active material 70 as well as one or more catalysts 62 that are reactive to or activated upon exposure to non-thermal energy.

Thus, in certain embodiments of the present invention, the active coating 60 comprises a catalyst 62 that is activated by application of a non-thermal energy source. Such catalysts 62 are selected to excite, heat, and/or activate upon application of non-thermal energy, including non-thermal plasma or microwave energy, thus rapidly reaching activation temperature. Preferred catalyst 62 materials that are activated upon exposure to non-thermal microwave energy include those metals selected from the group: noble metals, including platinum, (Pt), palladium (Pd), rhodium (Rh), iridinium (Ir), or coinage metals including gold (Au), copper (Cu) or appropriate alloys of each that are supported on, or contained within, oxides of such metals as titanium (Ti), lanthanum (La), cerium (Ce), or any of several ferrites and mixtures thereof. For example, certain preferred catalysts 62 include Au supported on titania, Au supported on lanthana, or Au supported on ceria. Gold supported on titania particles are particularly preferred catalysts 62 that are activated by exposure to a non-thermal plasma environment and conduct a water gas shift reaction.

In some embodiments, the catalysts 62 may include a mixture of those that are activated by non-thermal energy and those that are traditional and not activated by non-thermal energy. Thus, in some embodiments, the active coating 60 comprises a plurality of catalysts 62 included within the active layer 60, where one or more catalysts 62 are activated by non-thermal energy, and where one or more of the other catalysts 62 are traditional catalysts that are not activated by non-thermal energy.

Accordingly, the present invention uses a non-thermal energy source, such as a gas plasma generator (such as 34 of FIG. 2) or microwave energy generator (such as 42 of FIG. 5), to accelerate and reduce the time necessary for a catalytic system to become sufficiently active to conduct the desired chemical reactions, thus providing a "rapid start-up". In other embodiments, the non-thermal energy source can be applied to augment the reactor system temperature during transient operating conditions, where high load or other factors may reduce the temperature of the catalyst bed 32 below the normal catalytic activation temperature range. In certain embodiments, a reactor 24 has a flow passage 30 that includes a catalyst bed 32 disposed in the flow passage 30 and a non-thermal plasma generator 34 for generating a non-thermal plasma in at least a portion of the catalyst bed 32. Reactor systems incorporating a non-thermal energy generator are disclosed in co-pending commonly assigned U.S. patent application Ser. No. 10/414,616 to Voecks filed on Apr. 16, 2003 that published as U.S. Application Publication No. 2004/0206618, which is herein incorporated by reference in its entirety. Non-thermal energy generators 40 include, by way of example, a dielectric barrier discharge generator, a pulsed corona discharge-type plasma generator, silent discharge plasma generator, radio frequency, microwave generator, or combinations thereof. In certain preferred embodiments, the non-thermal energy generator 40 is a non-thermal plasma generator. In certain embodiments, the non-thermal energy generator 40 is a microwave emitting device, as described in more detail below.

The plasma generating device 34 as shown in FIG. 2 is known as a corona discharge-type and includes an electrode 36 which circumferentially surrounds the catalyst bed 32 and an axially extending second electrode 38 which extends axially through the first cylindrical electrode 36. An electrical source 40 is connected to the first and second electrodes 36, 38 and preferably provides electrical pulses to the first and second electrodes 36, 38 at such a voltage and duration so as to generate a non-thermal plasma that permeates the catalyst bed 32, but that does not permit arcing between the first and the second electrodes 36, 38, respectively. By providing short duration pulses, a non-thermal plasma can be generated without permitting an arc to fully develop.

Figure 5:
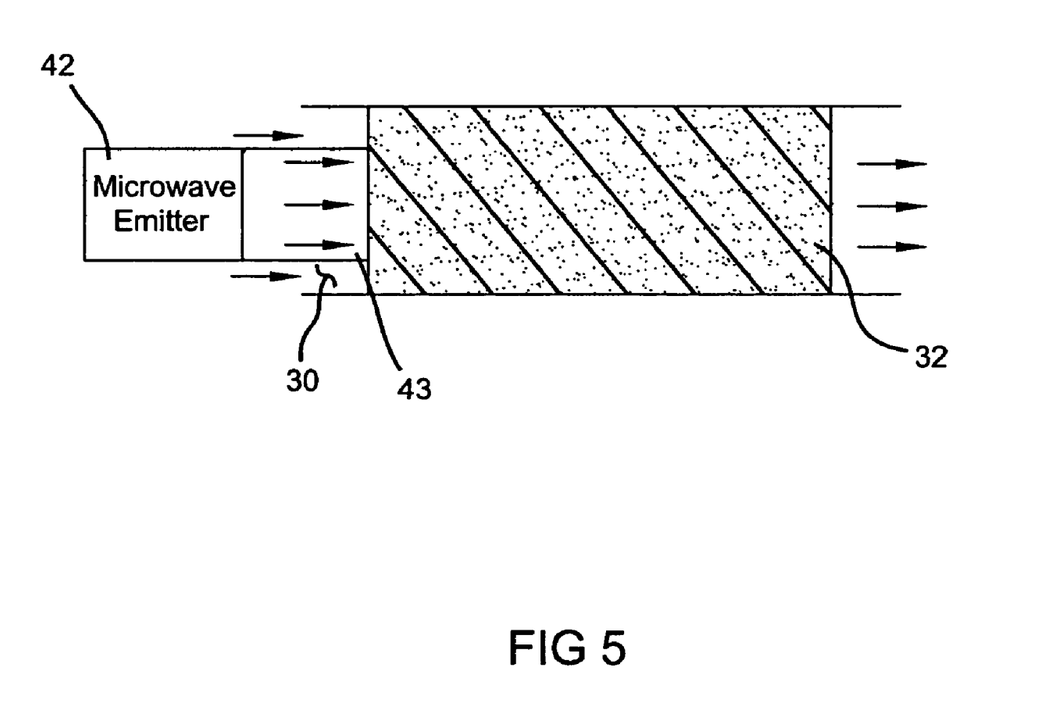
FIG. 5 is a cross-sectional view of a WGS reactor utilizing a microwave generated plasma in the catalyst bed according to the principles of the present invention.

An alternative non-thermal energy generating device could include a microwave emitting device 42 as illustrated in FIG. 5. According to this embodiment, a microwave emitting device 42 is provided with a wave guide 43 for directing microwaves to the flow passage 30 for emitting microwave electric discharges into the catalyst bed 32 for generating a plasma therein.

The introduction of non-thermal energy to the catalyst bed containing an active coating in accordance with the present invention provides a much faster initiation of reaction and provides a rapid start-up for reactions, such as water gas shift. Further, by applying non-thermal energy to the reactor bed including a catalyst support having the active coating, the activation of the bed is even and efficient. By enhancing the catalyst activation in the active coating, the materials are capable of reaching and sustaining the maximum temperature of the catalyst bed much more rapidly and evenly. Thus, various embodiments of the present invention improve both start-up time or sustain operations through transient periods, as well as improve energy efficiency of a reactor system in a fuel processor for a fuel cell.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reactor for rapid start-up, comprising:
   a catalyst support structure having a surface with one or more regions overlaid with an active coating comprising a catalyst, wherein said active coating heats upon exposure to a non-thermal energy source; and
   a generator of non-thermal energy for applying said non-thermal energy to said active coating,
   wherein said catalyst support structure is an open structured porous foam with a tortuous flow pattern that enhances non-thermal energy penetration and facilitates penetration of one or more reactants introduced to the reactor and said regions are located on a surface of said tortuous flow pattern,
   wherein said active coating further comprises an active material that heats upon exposure to said non-thermal energy source and said active coating comprises a first layer and a second layer, wherein said first layer comprises said active material and is disposed on said one or more regions of said surface of said catalyst support structure and said second layer comprises said catalyst and is disposed on said first layer with said first layer between said second layer and said support structure.

2. The reactor of claim 1, wherein said catalyst is activated upon exposure to said non-thermal energy.

3. The reactor of claim 2, wherein said catalyst comprises at least one of: gold, copper, platinum, rhodium, palladium, chromium, iridium and alloys thereof.

4. The reactor of claim 1, wherein said catalyst is supported on a metal oxide comprising at least one of: titanium, cerium, lanthanum, zinc and tin.

5. The reactor of claim 1, wherein said active material is one or more of: titania, ceria, lanthana, silicon carbide, and ferrites.

6. The reactor of claim 1, wherein both said active material and said catalyst are activated upon exposure to said non-thermal energy source.

7. The reactor of claim 1, wherein said generator is selected from the group consisting of: a dielectric barrier discharge generator, a pulsed corona discharge-type plasma generator, silent discharge plasma generator, radio frequency, microwave generator, and combinations thereof.

8. The reactor of claim 1, wherein the reactor is a shift reactor and said catalyst facilitates a water gas shift reaction.

9. The reactor of claim 1, wherein the reactor is a preferential oxidation reactor and said catalyst facilitates a preferential oxidation reaction.

10. A method for operating a reactor during transient and/or start-up conditions comprising:
   providing a catalyst support structure having a surface with one or more regions overlaid with an active coating comprising a catalyst, wherein said active coating is capable of heating upon exposure to a non-thermal energy source;
   generating non-thermal energy for heating of said active coating with a non-thermal energy source generator; and
   heating said active coating to a temperature greater than or equal to an activation temperature of said catalyst,
   wherein said generating continues only until said active coating reaches a temperature equal to or greater than an activation temperature and said catalyst sustains reaction via thermal heat provided to, or generated within, the reactor.

11. The method of claim 10, further comprising after said heating, converting one or more reactants to a product by reaction via said catalyst.

12. The method of claim 10, wherein said catalyst is a water gas shift catalyst and said converting includes oxidizing carbon monoxide to carbon dioxide by a water gas shift reaction.

13. The method of claim 10, wherein said catalyst is a preferential oxidation catalyst and said converting includes oxidizing carbon monoxide to carbon dioxide by preferential oxidation.

14. The method of claim 10, wherein said active coating further comprises an active material, and said heating includes heating said active material by said generated non-thermal energy.

15. A shift reactor comprising:

a catalyst support structure having a surface with one or more regions overlaid with an active coating comprising a water gas shift catalyst, wherein said active coating heats to catalyst activation temperatures upon exposure to a non-thermal energy source; and a generator of non-thermal energy for applying said non-thermal energy to said active coating, wherein said active coating further comprises an active material that heats upon exposure to said non-thermal energy source and said active coating comprises a first layer and a second layer, wherein said first layer comprises said active material and is disposed on said one or more regions of said surface of said support structure and said second layer comprises said catalyst and is disposed on said first layer with said first layer between said second layer and said support structure.

* * * * *